United States Patent
Hirokawa et al.

(10) Patent No.: US 10,632,661 B2
(45) Date of Patent: Apr. 28, 2020

(54) METHOD FOR PRODUCING AN EXTRUSION MOLDED PRODUCT FOR AUTOMOBILES

(71) Applicants: Tokiwa Chemical Industries Co., Ltd., Shiroi-shi, Chiba (JP); System Technical Co., Ltd., Inzai-shi, Chiba (JP)

(72) Inventors: Takashi Hirokawa, Chiba (JP); Katsuhisa Kato, Chiba (JP)

(73) Assignees: TOKIWA CHEMICAL INDUSTRIES CO., LTD., Chiba (JP); TOKIWA KEISEI CO., LTD., Chiba (JP)

( * ) Notice: Subject to any disclaimer, the term of this patent is extended or adjusted under 35 U.S.C. 154(b) by 323 days.

(21) Appl. No.: 15/787,974

(22) Filed: Oct. 19, 2017

(65) Prior Publication Data

US 2018/0162033 A1 Jun. 14, 2018

(30) Foreign Application Priority Data

Dec. 13, 2016 (JP) .................................. 2016-241104
Aug. 10, 2017 (JP) .................................. 2017-155302

(51) Int. Cl.
*B29C 48/155* (2019.01)
*B29C 48/00* (2019.01)
(Continued)

(52) U.S. Cl.
CPC ........ *B29C 48/155* (2019.02); *B29C 48/0019* (2019.02); *B29C 48/0022* (2019.02);
(Continued)

(58) Field of Classification Search
CPC ....... B29C 48/155; B29C 69/00; B29C 48/30; B29C 48/34; B29C 48/91; B29C 48/92;
(Continued)

(56) References Cited

U.S. PATENT DOCUMENTS 5,085,902 A * 2/1992 Yada ....................... B60R 13/04
428/31
6,217,807 B1 * 4/2001 Miyakawa ............... B60J 10/18
264/171.14
(Continued)

FOREIGN PATENT DOCUMENTS

JP  2005-161800  6/2005

*Primary Examiner* — Jeffrey M Wollschlager
(74) *Attorney, Agent, or Firm* — Wenderoth, Lind & Ponack, L.L.P.

(57) ABSTRACT

A method for producing an extrusion molded product for automobiles, comprising the following steps:
A synthetic resin injected into a first extrusion molding machine (21) is extruded through a first mold die (20) as a core material (3); the core material (3) passes through a first cooling tank (25), and then is bent by bending rollers (22) into a desired curved shape with a radius of curvature R1; the core material (3) is extended linearly, and goes into a second mold die (23); a thermoplastic elastomer injected in a second extrusion molding machine (24) forms seal portions (2) and seal lip portions (6) on a periphery of the core material (3); thereby forming a curved portion with a radius of curvature R2 on the extrusion molded product (1).

14 Claims, 13 Drawing Sheets

(51) Int. Cl.
  B29C 48/79    (2019.01)
  B29C 48/88    (2019.01)
  B60J 10/88    (2016.01)
  B29C 48/16    (2019.01)
  B29D 99/00    (2010.01)
  B29C 53/08    (2006.01)
  B29C 48/92    (2019.01)
  B29C 48/91    (2019.01)
  B29C 48/34    (2019.01)
  B29C 48/30    (2019.01)
  B29C 69/00    (2006.01)
  B29K 23/00    (2006.01)
  B29K 105/16   (2006.01)
  B29L 31/30    (2006.01)
  B29L 31/00    (2006.01)
  B29C 55/00    (2006.01)

(52) U.S. Cl.
  CPC ............ B29C 48/022 (2019.02); B29C 48/16 (2019.02); B29C 48/30 (2019.02); B29C 48/34 (2019.02); B29C 48/79 (2019.02); B29C 48/91 (2019.02); B29C 48/911 (2019.02); B29C 48/92 (2019.02); B29C 53/083 (2013.01); B29C 69/00 (2013.01); B29D 99/0053 (2013.01); B60J 10/88 (2016.02); B29C 55/00 (2013.01); B29K 2023/12 (2013.01); B29K 2105/16 (2013.01); B29L 2031/006 (2013.01); B29L 2031/30 (2013.01)

(58) Field of Classification Search
  CPC ....... B29C 53/083; B29C 53/02; B29C 48/16; B29C 48/0022; B29C 48/911; B29C 48/79; B29C 48/022; B29C 48/0019; B29C 55/00; B29C 48/154; B29D 99/0053; B60J 10/88; B29L 2031/006; B29L 2031/30; B29L 2031/26; B29K 2105/16; B29K 2023/12
  USPC ............. 264/167, 177.1, 209.2, 209.3, 210.1
  See application file for complete search history.

(56) References Cited

U.S. PATENT DOCUMENTS

| | | | | |
|---|---|---|---|---|
| 2004/0041285 | A1* | 3/2004 | Xiang | F23D 3/08 261/99 |
| 2004/0245665 | A1* | 12/2004 | Yamaguchi | B29C 53/083 264/40.1 |
| 2005/0227086 | A1* | 10/2005 | Murphy | B32B 27/32 428/423.1 |
| 2006/0267362 | A1* | 11/2006 | Miyakawa | B26D 3/12 296/1.08 |
| 2007/0169417 | A1* | 7/2007 | Ellis | B29C 48/30 49/490.1 |
| 2010/0239826 | A1* | 9/2010 | Hiroe | B60J 10/18 428/174 |
| 2011/0023372 | A1* | 2/2011 | Miyakawa | B60J 10/18 49/490.1 |
| 2017/0043811 | A1* | 2/2017 | Bogachuk | B62D 25/04 |

* cited by examiner

A-A

METHOD FOR PRODUCING AN EXTRUSION MOLDED PRODUCT FOR AUTOMOBILES

BACKGROUND OF THE INVENTION

Field of the Invention

The present invention relates to a method for producing an extrusion molded product for automobiles integrally forming: a core material of resin to be mounted on an upper side portion of an automobile door frame (11) in such a manner as to be fitted on the door frame (11); and seal portions (2) that each have one or more seal lip portions (6) to seal a door glass (10).

Description of the Related Art

In the conventional extrusion molded product (1) integrating a core material of rigid synthetic resin to be mounted and firmly fitted on an upper side portion of an automobile door frame (11) and seal portions (2) of thermoplastic elastomer to seal a door glass (10), the upper side of the door frame (11) is curved, and thus, the linearly extruded extrusion molded product (1) having a core material (3) of rigid synthetic resin can be bent while being fitted on a mildly curved flange (12) of the door frame (11), but cannot be easily bent in case that the door frame (11) is formed into a curved shape with a small radius of curvature R, and thus, the work of mounting and fitting the extrusion molded product (1) onto the flange (12) of the automobile door frame (11) takes a lot of time and trouble. Thus, the extrusion molded product (1) needs to be bent longitudinally beforehand, for which process, there has been proposed a conventional method wherein a resin mold extruded by an extrusion molding machine is continuously pressed by bending rollers so as to be transformed into a curved shape, as disclosed in Patent Literature 1.

PRIOR ART DOCUMENT

Patent Literature 1: Japanese Patent Application Laid-Open Publication No. 2005-161800

SUMMARY OF THE INVENTION

Problem to be Solved by the Invention

In the conventional technique disclosed in the above-mentioned Patent Literature 1, a rigid core material (3) of synthetic resin can be bent into a curved shape by a pressing force of rollers. However, there is a problem when an extrusion molded product (1) integrating a rigid core material (3) of synthetic resin and seal portions (2) of soft thermoplastic elastomer is pressed by bending rollers so as to be transformed into a desired curved shape with a radius of curvature R that corresponds to the curved shape of the door frame (11). Since the seal portions (2) of the extrusion molded product (1) that contact the bending rollers (22) are made of a soft material, i.e., thermoplastic elastomer, as shown by, for example, FIG. 11, the seal portions (2), when pressed by the bending rollers (22), shrink temporarily in such a manner as to absorb the pressing force by just elastically shrinking their cross sections. Thus, the extrusion molded product (1) cannot be easily transformed into a desired curved shape with the same radius of curvature R as that of the door frame (11).

Furthermore, there is another problem that when the extrusion molded product (1) integrating a core material (3) of synthetic resin and seal portions (2) of thermoplastic elastomer is bent into a desired curved shape with the same radius of curvature R as that of the door frame (11), the pressing force by the bending rollers (22) is too strong, which causes the cross sections of the seal portions (2) of the extrusion molded product (1) to be transformed and crushed, wherein a seal lip portion (6) is transformed, for example, into a wavy shape (36) as shown in FIG. 15.

The present invention has been made in order to solve the above-mentioned problems, and it is an object of the present invention to provide a method for producing an extrusion molded product for automobiles that can be perfectly mounted and fitted on the curved portion of a door frame in such a manner that when the extrusion molded product (1) integrating a core material (3) of synthetic resin and seal portions (2) of thermoplastic elastomer is bent into a desired curved shape with the same radius of curvature R as that of the door frame (11), the cross sections of the seal portions (2) and the seal lip portions (6) do not transform.

Means to Solve the Problems

In the method for producing an extrusion molded product for automobiles according to the present invention to solve the above-mentioned problems, an extrusion molded product (1) integrally forming a core material (3) of synthetic resin to be firmly fitted on a flange (12) of an automobile door frame (11) and seal portions (2) that each have one or more seal lip portions (6) to seal a door glass (10), is produced as follows:

First of all, a synthetic resin injected into a first extrusion molding machine (21) is extruded through a first mold die (20) as a core material (3). The core material (3) passes through a first cooling tank (25) and through a first take-up machine (26), and then is bent by bending rollers (22) into a desired curved shape with a radius of curvature R1. After that, the core material (3) is extended linearly, and goes into a second mold die (23). In this situation, the linear core material (3) going into the second mold die (23) has a stress trying to return its radius of curvature to the radius of curvature R1. Thus, the extrusion molded product (1), which is finally produced by forming, on a periphery of the core material (3), seal portions (2) and one or more seal lip portions (6) provided on each of the seal portions (2) from a thermoplastic elastomer injected in a second extrusion molding machine (24) and then passing the whole thereof through a second take-up machine (28), is formed so as to have a curved portion with a radius of curvature R2, without any transformation of the cross sections of the seal portions (2) and the seal lip portions (6).

In this connection, after going through the bending rollers (22), the core material (3) is taken up linearly by a second take-up machine (28). Thus, the radius of curvature R2 of the curved portion of the extrusion molded product (1) is larger than the radius of curvature R1 of the curved portion of the core material (3).

Here, reference is made to the occasion where the extrusion molded product (1) formed with a radius of curvature R2 is to be mounted on an automobile door frame (11) with a radius of curvature R or on a portion having such a large radius of curvature that its curved shape is close to a linear line. Since the extrusion molded product (1) capable of being mildly bent is formed with a radius of curvature R2, trying to fit the core material (3) of synthetic resin onto a flange (12) of a door frame (11) while positioning the core material (3) along the flange (12), allows the core material (3) to be perfectly fitted on an automobile door frame (11) with a radius of curvature R that is different from the radius of curvature R2 or to be perfectly fitted on a portion having such a large radius of curvature that its curved shape is close to a linear line.

Furthermore, in order to ensure firm fitting of the core material (3) of synthetic resin on the flange (12) so that the core material (3) is perfectly fitted on an automobile door frame (11) with a radius of curvature R or on a portion having such a large radius of curvature that its curved shape is close to a linear line, the core material (3) of synthetic resin comprises an outer-periphery side wall portion (15), an inner-periphery side wall portion (16) and a connecting portion (17) that connects those side wall portions such that the core material (3) is formed so at to have an approximately U-shaped cross section, and besides, at least one holding lip portion (4) is formed on at least one of the inner sides of the side wall portions (15),(16). This construction allows the core material (3) to be mounted more firmly while being fitted onto the flange (12) of the door frame (11), which means that the extrusion molded product (1) with a radius of curvature R2 can be fitted more firmly on the doorframe (11) with a radius of curvature R or on a portion having such a large radius of curvature that its curved shape is close to a linear line.

Next, in another embodiment of the present invention, an extrusion molded product (1) integrating a core material (3) of synthetic resin and seal portions (2) that each have one or more seal lip portions (6) to seal a door glass (10) is produced as follows:

First of all, a synthetic resin injected in a first extrusion molding machine (21) is extruded through a first mold die (20) as a core material (3). The core material (3) passes through a first cooling tank (25) and through a first take-up machine (26), and then is bent by bending rollers (22) into a desired curved shape with a radius of curvature R1. After that, the core material (3) is bent into a curved shape with a radius of curvature R3, is fed to a position just before a second mold die (23), and is extended linearly before going into the second mold die (23). The core material (3) travels linearly inside the second mold die (23), while a thermoplastic elastomer injected in a second extrusion molding machine (24) forms, on a periphery of the core material (3), seal portions (2) and one or more seal lip portions (6) provided on each of the seal portions (2), and then, the core material (3) passes through a second take-up machines (28). In this way, an extrusion molded product (1) is produced so as to have a curved portion with a radius of curvature R2 without transforming the cross sections of the seal portions (2) and the seal lip portions (6).

In this connection, if the surface of the core material (3) is too cold when the thermoplastic elastomer injected into the second extrusion molding machine (24) forms seal portions (2) on a periphery of the core material (3), the seal portions (2) cannot be thermally adhered firmly onto the periphery of the core material (3). Thus, before the core material (3) goes into the second mold die (23), the surface of the core material (3) is warmed by a heating device (29), which provides an advantage of enhancing the adhesive strength of heat welding.

The synthetic resin to be used for a core material (3) can be an olefin resin having a type A durometer hardness (Shore A) of 85 or more or a mixed synthetic resin obtained by mixing an olefin resin with 20 to 50% by weight of powder of talc, wollastonite, or the like, which provides an advantage of decreasing the linear expansion coefficient thereof.

As a thermoplastic elastomer to be used for the seal portions (2), an olefin resin having a type A durometer hardness (Shore A) of 50 to 85 is adopted, which provides an advantage of enhancing the sealing performance between the seal portions (2) and the door glass (10).

Furthermore, at least one non-shrinkable element (13) made of metal, glass fiber or wollastonite is formed inside of the core material (3), which provides an advantage of allowing the linear expansion of the extrusion molded product (1) to decrease in the longitudinal direction.

Advantageous Effects of the Invention

In the extrusion molded product having a core material for automobiles produced by a method for producing an extrusion molded product for automobiles according to the present invention, the core material (3) of synthetic resin, formed by the first mold die (20) located after the first extrusion molding machine (21), has no thermoplastic elastomer coating layer, i.e., no seal portions (2) formed on a periphery of the core material (3). Thus, the core material (3) has an advantageous effect that it can easily be bent into a desired curved shape without causing the cross sections of the seal portions (2) and the seal lip portions (6) to be transformed by any pressing force.

Next, the core material (3) bent by bending rollers (22) into a curved shape with a radius of curvature R1 is taken up linearly during the process after the bending rollers (22) up to the second take-up machine (28). Thus, the linear core material (3), which goes into the second mold die (23) after being extended linearly, has a stress trying to return its radius of curvature to the radius of curvature R1.

The thermoplastic elastomer injected from the second extrusion molding machine (24) into the second mold die (23) is extruded as an extrusion molded product (1) having seal portions (2) of thermoplastic elastomer, and the like on its periphery. In this connection, after the extrusion molded product (1) passes through the second take-up machine (28), the internal stress of the core material (3) trying to return its radius of curvature to the radius of curvature R1 serves to realize a bending that is milder than the curve with a radius of curvature R1, and thus, the cross sections of the seal portions (2) and the seal lip portions (6) of thermoplastic elastomer shrink to a degree that the cross sections do not transform like a wavy shape (36) as shown in FIG. 15, thereby producing an extrusion molded product (1) whose radius of curvature R2 is larger than the radius of curvature R1.

As a result, when the extrusion molded product (1) with a radius of curvature R2 is to be fitted onto a flange (12) of a door frame (11) with a radius of curvature R2, there are advantages as follows: For example, in case of R2>R, the extrusion molded product (1) according to the present invention is formed so as to have a radius of curvature R2, and thus, when the extrusion molded product (1) is bent in order to be fitted onto the flange (12) with a radius of curvature R of a door frame (11), it is enough for the extrusion molded product (1) to be bent by only a smaller angle, compared to the bending angle of the conventional linear extrusion molded product (1). Thus, the extrusion molded product (1) according to the present invention can be bent and fitted onto the flange (12) without transforming the cross sections of the seal portions (2) and the seal lip portions (6). In case of R>R2, the extrusion molded product (1) with a radius of curvature R2 is to be fitted onto a flange (12) with a radius of curvature R of a door frame (11) by extending the extrusion molded product (1). Here, the seal portions (2) and the seal lip portions (6), which are formed of a thermoplastic elastomer having elasticity, can extend together with the core material (3) without any problem so as to allow the extrusion molded product (1) to be fitted on the flange (12) with a radius of curvature R of the door frame (11).

Furthermore, the core material (3), bent by bending rollers (22) into a curved shape with a radius of curvature R1, is fed to a position just before the second mold die (23) in the state of being bent into a curved shape with a radius of curvature R3, and is extended linearly before going into the second mold die (23). Inside the second mold die (23), the core material (3) travels linearly while a thermoplastic elastomer injected in a second extrusion molding machine (24) forms, on a periphery of the core material (3), seal portions (2) and one or more seal lip portions (6) provided on each of the seal portions (2), and then passes through the second take-up machine (28). In the extrusion molded product (1) produced according to this method, the cross sections of the seal portions (2) and the seal lip portions (6) do not transform, and in case of forming a curved portion with a radius of curvature R2, there is an advantage that the full length of the equipment for producing the extrusion molded product for automobiles can be shortened.

In this connection, if the surface of the core material (3) is too cold when forming seal portions (2) on a periphery of the core material (3), the seal portions (2) cannot be thermally adhered firmly on the periphery of the core material (3). Thus, before the core material (3) goes into the second mold die (23), the surface of the core material (3) is warmed by a heating device (29), which provides an advantage of enhancing the adhesive strength of heat welding.

Furthermore, at least one non-shrinkable element (13) made of metal, glass fiber or wollastonite is formed inside of the core material (3), thereby providing an advantage of allowing the linear expansion of the extrusion molded product (1) to decrease in the longitudinal direction so that the extrusion molded product (1) can be properly mounted on a door frame.

Furthermore, the core material (3) of synthetic resin is provided with an outer-periphery side wall portion (15), an inner-periphery side wall portion (16) and a connecting portion (17) that connects the side wall portions, wherein at least one holding lip portion (4) is formed on at least one of the inner sides of the side wall portions (15),(16), which provides an advantage that the extrusion molded product (1) can be mounted while being firmly fitted onto a flange (12) of a door frame (11).

DETAILED DESCRIPTION OF THE PREFERRED EMBODIMENTS

Preferred embodiments of a method for producing an extrusion molded product according to a first to third examples of the present invention and preferred embodiments of an extrusion molded product produced according to those methods will be described in detail hereinafter with reference to the accompanying drawings. The embodiments described below are only examples of the present invention, and thus, the present invention, which is by no means limited to the embodiments, can be realized in all kinds of variants within the technical idea of the present invention.

Example-1

Figure 1:
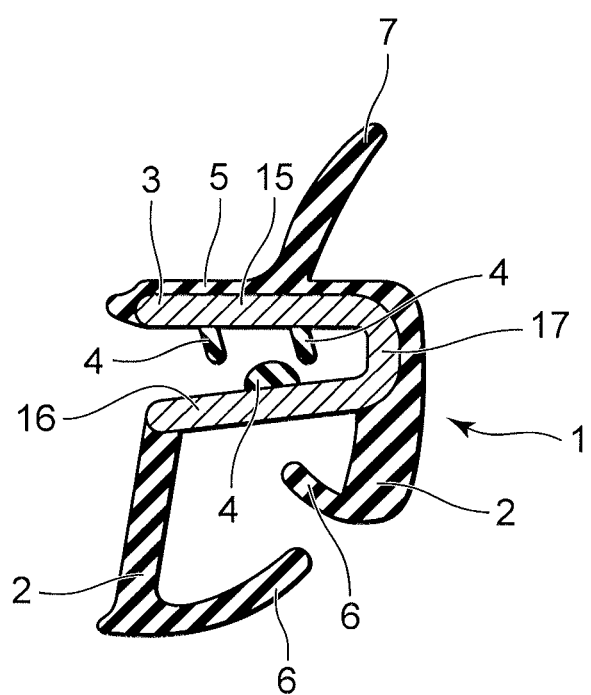
FIG. 1 is a longitudinal sectional side view of an example of an extrusion molded product having a core material for automobiles, produced by a method for producing an extrusion molded product for automobiles according to the present invention.
Figure 4:
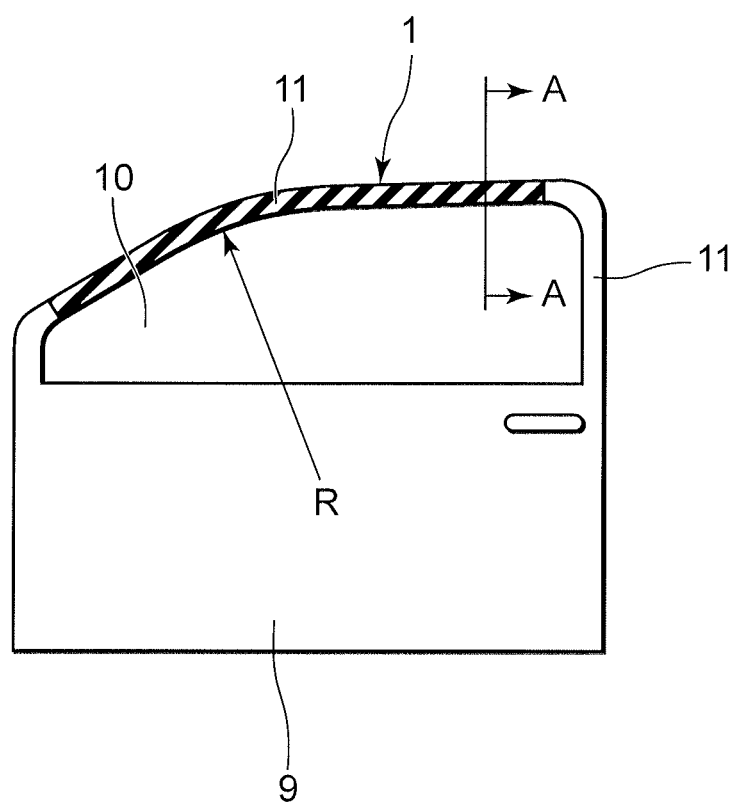
FIG. 4 is a side view of an extrusion molded product having a core material for automobiles, produced by a method for producing an extrusion molded product for automobiles according to the present invention, which is mounted on an upper portion of an automobile door frame.
Figure 5:
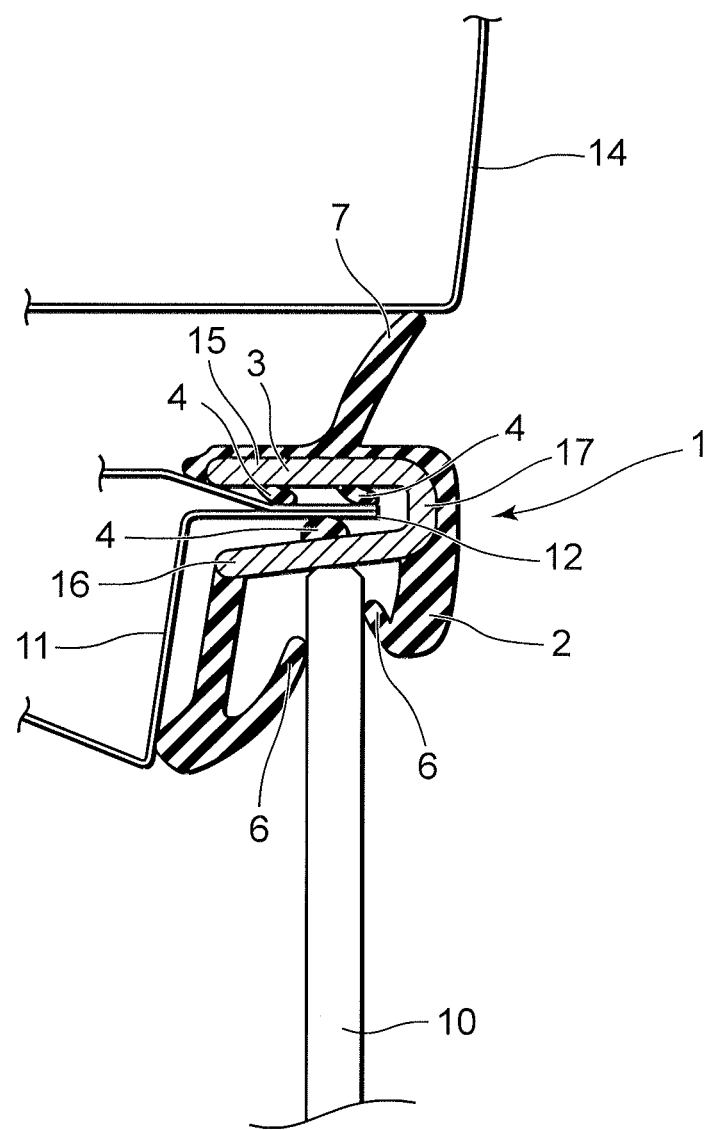
FIG. 5 is a partially enlarged longitudinal sectional view taken along line A-A in FIG. 4.

An extrusion molded product having a core material for automobiles according to Example-1 produced by a method for producing an extrusion molded product for automobiles according to Example-1 of the present invention will be described with reference to the drawings. FIG. 1 shows a cross sectional view of an extrusion molded product (1) integrally forming: a core material of resin to be mounted on an upper side portion of an automobile door frame (11) as shown in FIG. 4 in such a manner as to be fitted on a flange (12) of a door frame (11) as shown in FIG. 5; and seal portions (2) of thermoplastic elastomer to seal a door glass (10). The core material (3) comprises an outer-periphery side wall portion (15), an inner-periphery side wall portion (16) and a connecting portion (17) that connects those side wall portions, such that the core material (3) is formed so as to have an approximately U-shaped cross section, wherein on at least one of the inner sides of the side wall portions (15),(16) is formed at least one holding lip portion (4); on at least one part of the outer periphery is formed a coating layer (5) of thermoplastic elastomer; on each of lower side faces (on each of right and left lower side faces seen in FIG. 1) of the core material (3) is formed a seal portion (2); on each of distal ends of the seal portions (2) is formed a seal lip portion (6); and on an upper side face of the core material (3) is formed a body seal lip portion (7). A required number and quantity of holding lip portions (4) may be formed, and it is also possible to form one or more holding lip portions (4) on only one of the two side wall portions. The core material (3) may be formed to have a variety of cross-sectional shapes, i.e., not only the U-shape but also a J-shape, an L-shape, an I-shape or the like.

Figure 2:
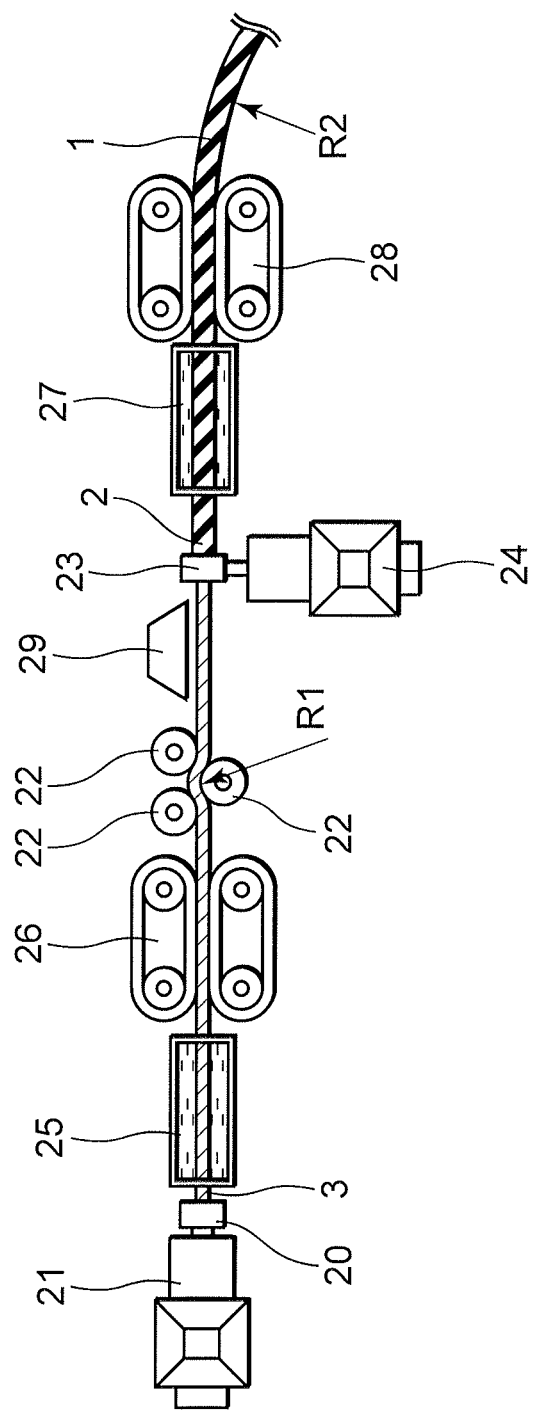
FIG. 2 is a top view of an example of a production process of a method for producing an extrusion molded product according to the present invention, wherein bending rollers are disposed after a take-up machine.

FIG. 2 is a top plan rough sketch showing an example of a method for producing an extrusion molded product for automobiles according to the present invention, wherein the extrusion molded product (1) is produced as follows: A synthetic resin injected in a first extrusion molding machine (21) is extruded through a first mold die (20) as a core material (3). The core material (3) passes through a first cooling tank (25) and through a first take-up machine (26), and then is bent by bending rollers (22) into a desired curved shape with a radius of curvature R1.

The core material (3) bent by bending rollers (22) into a curved shape with a radius of curvature R1, which is formed of synthetic resin so as to have a certain degree of elasticity, can be extended linearly. Thus, the core material (3) is extended linearly, and then its surface is warmed by a heating device (29) using infrared radiation, hot wind, or the like. After that, the core material (3) travels linearly inside the second mold die (23), wherein a thermoplastic elastomer injected in a second extrusion molding machine (24) forms, by extrusion molding, seal portions (2), at least one holding lip portion (4), a coating layer, one or more seal lip portions (6) provided on each of the seal portions (2) and a body seal lip portion (7) on a periphery of the core material (3).

The core material (3) having seal portions (2), at least one holding lip portion (4), a coating layer, one or more seal lip portions (6) provided on each of the seal portions (2) and a body seal lip portion (7) formed on a periphery of the core material (3) passes through a second take-up machine (28), and is cut into a desired length, thereby producing an extrusion molded product (1) having a core material (3) bent so as to have a curved portion with a radius of curvature R2.

Figure 15:
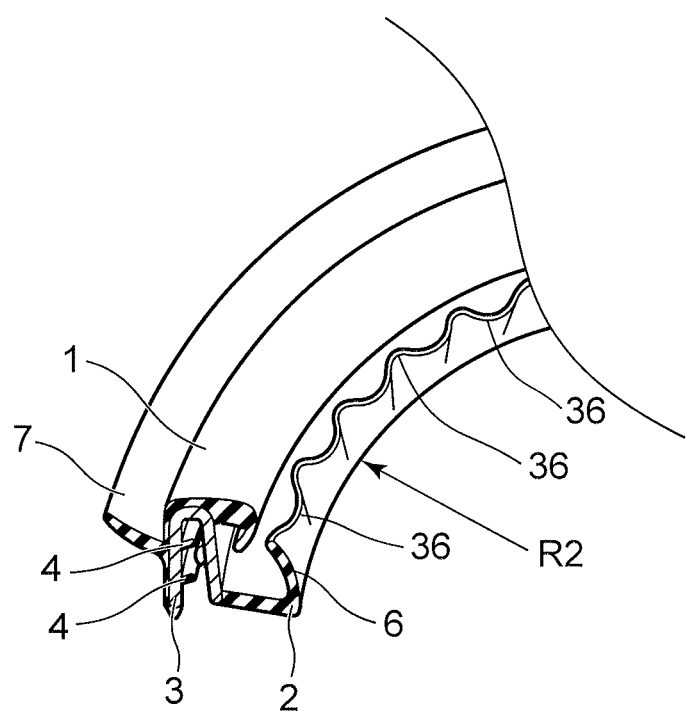
FIG. 15 is a rough sketch of an extrusion molded product whose core material and seal portions are integrally formed according to the conventional production method, wherein a seal lip portion is transformed when the extrusion molded product is bent into a curved shape.

Here, the linear core material (3) travelling inside the second mold die (23) is made of an elastic resin, and thus, has an inner stress trying to return its radius of curvature to the radius of curvature R1. Therefore, when the extrusion molded product (1), formed by extruding the thermoplastic elastomer injected in the second extrusion molding machine (24) as seal portions (2) and seal lip portions (6) on a periphery of the core material (3), has passed through the second take-up machine (28), the internal stress of the core material (3) trying to return its radius of curvature to the radius of curvature R1 serves to realize a bending curve that is milder than the curve with a radius of curvature R1, and thus, the cross sections of the seal portions (2) and the seal lip portions (6) of thermoplastic elastomer shrink to a degree that the cross sections do not transform like a wavy shape (36) as shown in FIG. 15, thereby realizing an extrusion molded product (1) whose radius of curvature R2 is larger than the radius of curvature R1.

Figure 3:
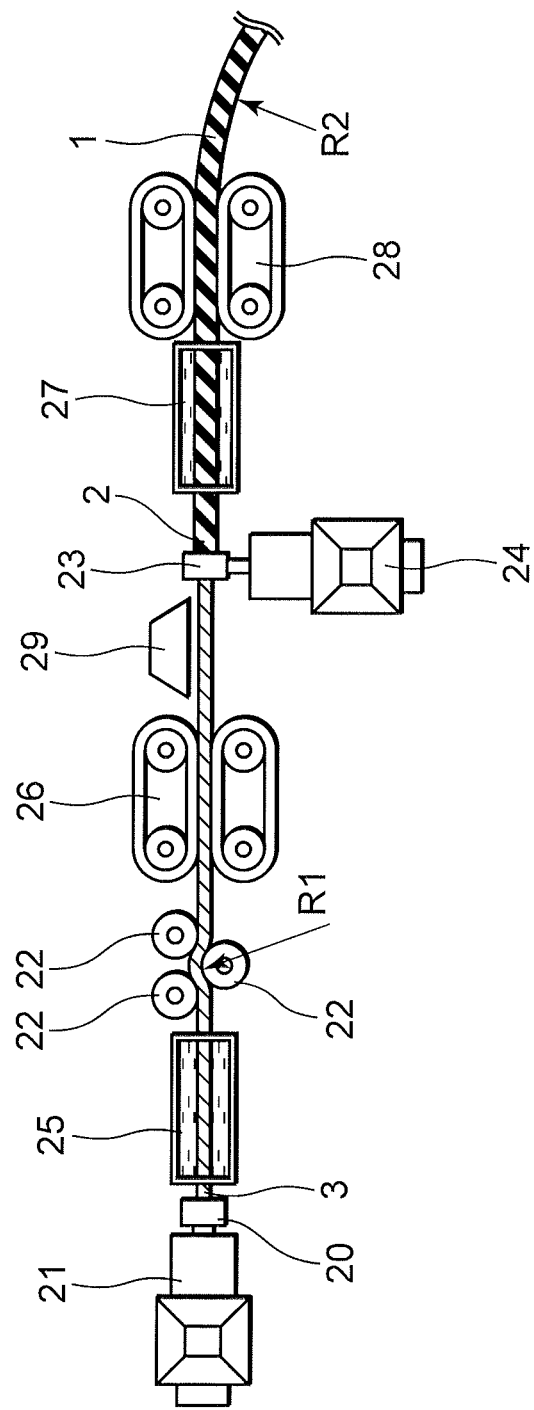
FIG. 3 is a top view of another example of a production process of a method for producing an extrusion molded product according to the present invention, wherein a take-up machine is disposed after bending rollers.
Figure 6:
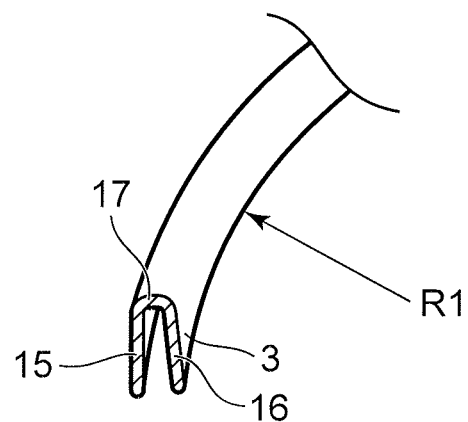
FIG. 6 is a perspective view of a core material bent into a curved shape with a radius of curvature R1 in a method for producing an extrusion molded product for automobiles according to the present invention.

FIG. 3 is a top plan rough sketch showing an example other than the one shown in FIG. 2 concerning a method for producing an extrusion molded product for automobiles according to the present invention, wherein the extrusion molded product (1) is formed so as to have a curved shape. A synthetic resin injected into a first extrusion molding machine (21) is extruded through a first mold die (20) as a core material (3). The core material (3) passes through a first cooling tank (25), and then is bent by bending rollers (22) into a desired curved shape with a radius of curvature R1, as shown in FIG. 6.

The core material (3), bent by bending rollers (22) into a curved shape with a radius of curvature R1, passes through a first take-up machine (26), and after that, the surface of the core material (3) is warmed by infrared radiation, hot wind, or the like while the core material (3) is in the state of being extended linearly. Then, the core material (3) in the state of being extended linearly travels linearly inside a second mold die (23), wherein a thermoplastic elastomer injected in a second extrusion molding machine (24) forms, by extrusion molding, seal portions (2), at least one holding lip portion (4), a coating layer, one or more seal lip portions (6) provided on each of the seal portions (2), and a body seal lip portion (7) on a periphery of the core material (3).

The core material (3) having seal portions (2), at least one holding lip portion (4), a coating layer, one or more seal lip portions (6) provided on each of the seal portions (2) and a body seal lip portion (7), formed on its periphery, passes through a second take-up machine (28), and is cut into a desired length, thereby producing an extrusion molded product (1) having a core material (3), bent so as to have a curved portion with a radius of curvature R2.

As is understood from the foregoing descriptions, the method for producing an extrusion molded product shown in FIG. 3 is different from the one shown in FIG. 2 in that the bending rollers (22) and the first take-up machine (26) are arranged in the reverse order.

For that reason, even in the case of FIG. 3, the linear core material (3) traveling inside the second mold die (23) has an inner stress trying to return its radius of curvature to the radius of curvature R1. Thus, when the extrusion molded product (1), formed by extruding the thermoplastic elastomer injected in the second extrusion molding machine (24) as seal portions (2) and one or more seal lip portions (6)

provided on each of the seal portions (2) on a periphery of the core material (3), has passed through the second take-up machine (28), the cross sections of the seal portions (2) and the seal lip portions (6) do not transform, and the extrusion molded product (1) comes to have a curve with a radius of curvature R2 that is milder than that of the radius of curvature R1 of the core material (3).

FIG. 4 roughly shows an extrusion molded product (1) mounted on an upper side portion of a door frame (11) of an automobile door (9). The door frame (11) has a curved portion with a radius of curvature R and a portion having such a large radius of curvature that its curve is close to a linear line. In order for the extrusion molded product (1) with a radius of curvature R2 to be mounted on a curved portion with a radius of curvature R or on a portion having such a large radius of curvature that its curve is close to a linear line, it is necessary to mildly bend the extrusion molded product (1) with a radius of curvature R2 such that the extrusion molded product (1) is further bent and extended.

However, in case of fitting the extrusion molded product (1) onto a flange (12) with a radius of curvature R of a door frame (11), it is enough for the extrusion molded product (1) to be bent by only a smaller angle, compared to the bending angle of the conventional linear extrusion molded product (1), because the extrusion molded product (1) according to Example-1 of the present invention is formed so as to have a radius of curvature R2. Thus, the extrusion molded product (1) according to Example-1 can be perfectly fitted onto the door frame (11) easily.

Furthermore, in order to ensure firm fitting of the core material (3) of synthetic resin on a flange (12) so that the core material (3) is perfectly fitted on an automobile door frame (11) with a radius of curvature R or on a portion having such a large radius of curvature that its curve is close to a linear line, the core material (3) of synthetic resin comprises an outer-periphery side wall portion (15), an inner-periphery side wall portion (16) and a connecting portion (17) that connects those side wall portions such that the core material (3) is formed so as to have an approximately U-shaped cross section, and besides, at least one holding lip portion (4) is formed on at least one of the inner sides of the side wall portions (15),(16).

As a result, even when the radius of curvature R2 of the extrusion molded product (1) is different from the radius of curvature R of a door frame (11) or even when the extrusion molded product (1) is to be mounted onto a large radius of curvature portion whose curve is close to a linear line, the extrusion molded product (1) can be firmly mounted on a flange (12) of a door frame (11) by fitting the extrusion molded product (1) on the radius of curvature R portion or on the large radius of curvature portion whose curve is close to a linear line.

In this respect, the radius of curvature R of the curved portion of the door frame (11) cannot be technically specified, because it varies depending on the design of the automobile and the type of the front door or the rear door. For instance, the radius of curvature R of the curved portion of a door frame is normally 1,900 mm in case of a front door, and 2,500 mm in case of a rear door. In many cases, the radius of curvature R thereof is approximately in the range of 1,600 to 3,500 mm, but in some cases, the radius of curvature R is in the range of 1,000 to 3,500, whose lower limit is much smaller, compared to the former.

FIG. 5 is a partially enlarged longitudinal sectional side view taken along line A-A in FIG. 4, wherein on an inner side of a core material (3) are formed holding lip portions (4) to serve the function of allowing a core material (3) to be fitted onto a flange (12) of a door frame (11); on lower sides of the core material (3) are formed seal portions (2) that each have, on their lower parts, a seal lip portion (6) to seal a door glass (10); and on an upper portion of the core material (3) is formed a body seal lip portion (7) to seal an automobile body (14).

Figure 8:
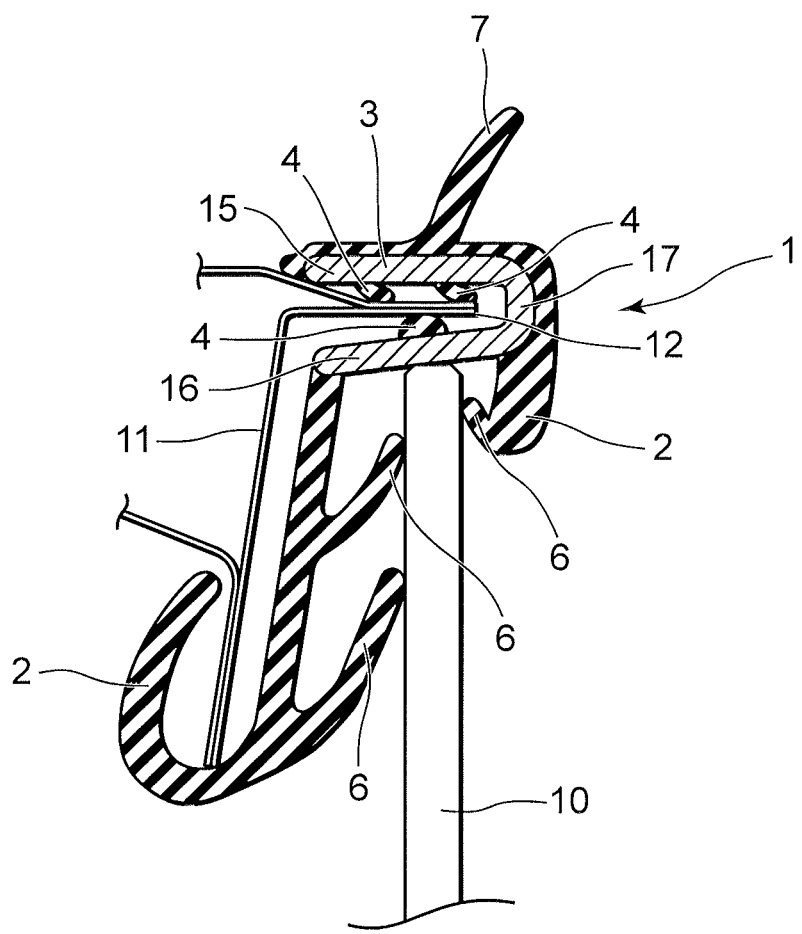
FIG. 8 is a partially enlarged longitudinal cross-sectional side view of another example of an extrusion molded product having a core material for automobiles, produced by a method for producing an extrusion molded product for automobiles according to the present invention, wherein the extrusion molded product whose right and left seal portions have seal lip portions formed asymmetrically in quantity, is mounted on an upper portion of an automobile door.

FIG. 8 shows another form of extrusion molded product (1) having a core material (3), wherein on an inner side of one seal portion (2) shown on the left side in the Figure (i.e., on the inner side of the automobile body) are formed two seal lip portions (6), and on an inner side of another seal portion (2) shown on the right side in the Figure (i.e., on the outer side of the automobile body) is formed one seal lip portion (6), such that the number of seal lip portions is different between the right and left seal portions.

Figure 9:
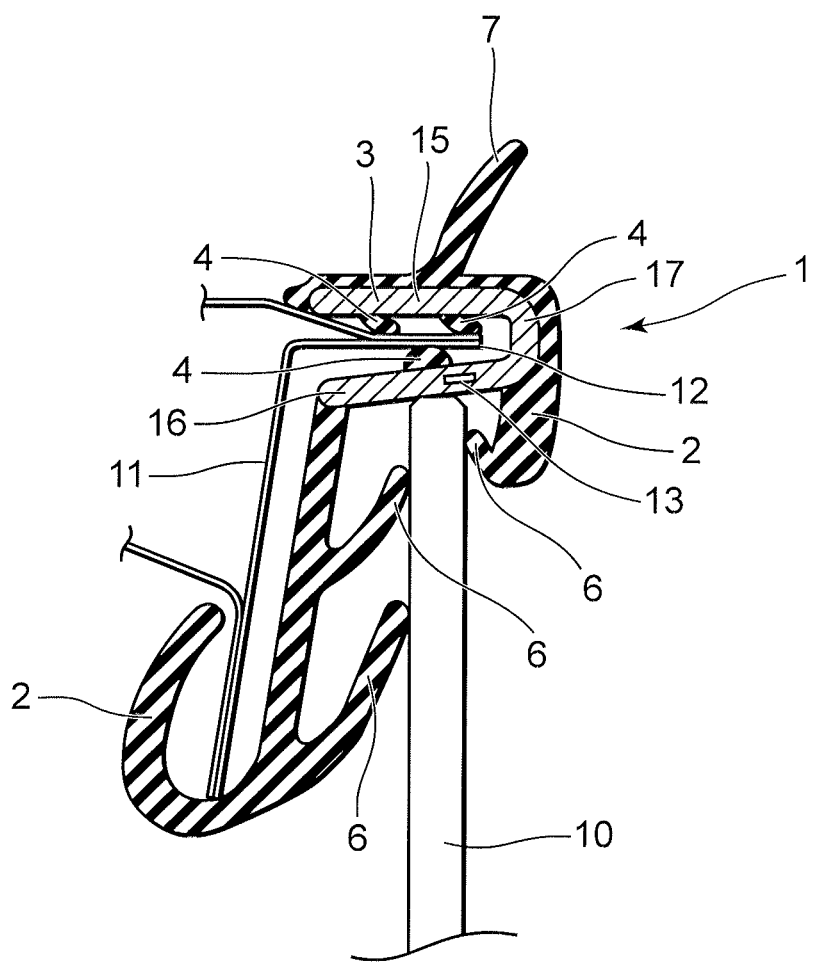
FIG. 9 is a partially enlarged longitudinal cross-sectional side view of still another example of an extrusion molded product having a core material for automobiles, produced by a method for producing an extrusion molded product for automobiles according to the present invention, wherein the extrusion molded product, whose core material has a non-shrinkable element provided inside thereof, is mounted on an upper portion of an automobile door.

FIG. 9 shows a still another form of extrusion molded product (1) having a core material (3), wherein at least one non-shrinkable element (13) made of metal, glass fiber or mineral such as wollastonite is provided inside the core material (3) of the extrusion molded product (1) shown in FIG. 8, wherein the non-shrinkable element (13) may be formed so as to have various shapes, such as a rectangle, a circle or the like, as necessary, and may be formed at a desired location inside the core material (3). In the example shown in FIG. 9 that is very close to FIG. 8, the non-shrinkable element (13) is provided inside the part of the core material (3) against whose surface a top end of the door glass (10) abuts. In the same way, the non-shrinkable element (13) may also be provided inside the core material (3) of the extrusion molded product (1) shown in FIGS. 1, 5 and 13.

Figure 10:
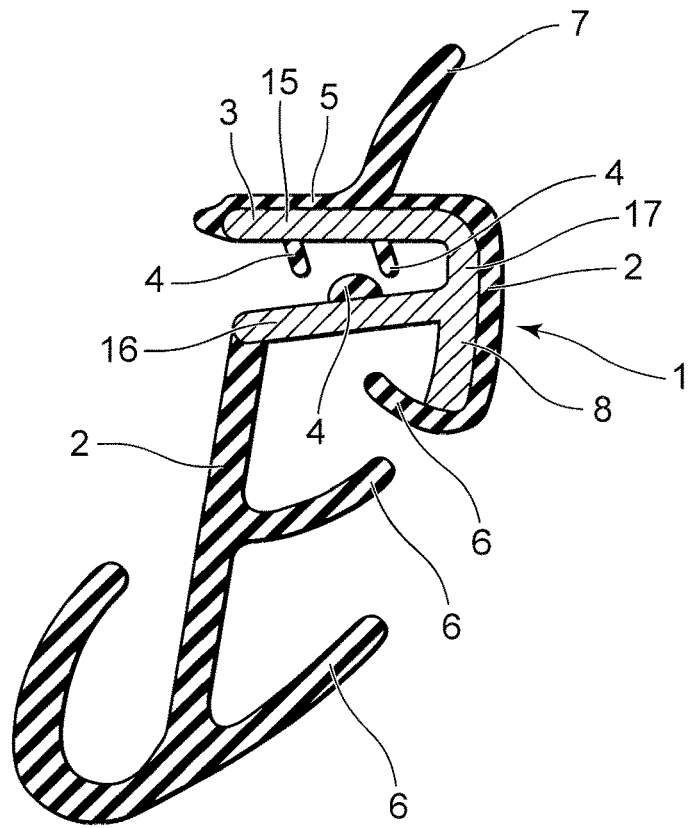
FIG. 10 is a longitudinal cross-sectional side view of still another example of an extrusion molded product having a core material for automobiles, produced by a method for producing an extrusion molded product for automobiles according to the present invention, wherein an extended portion is formed on the core material.
Figure 11:
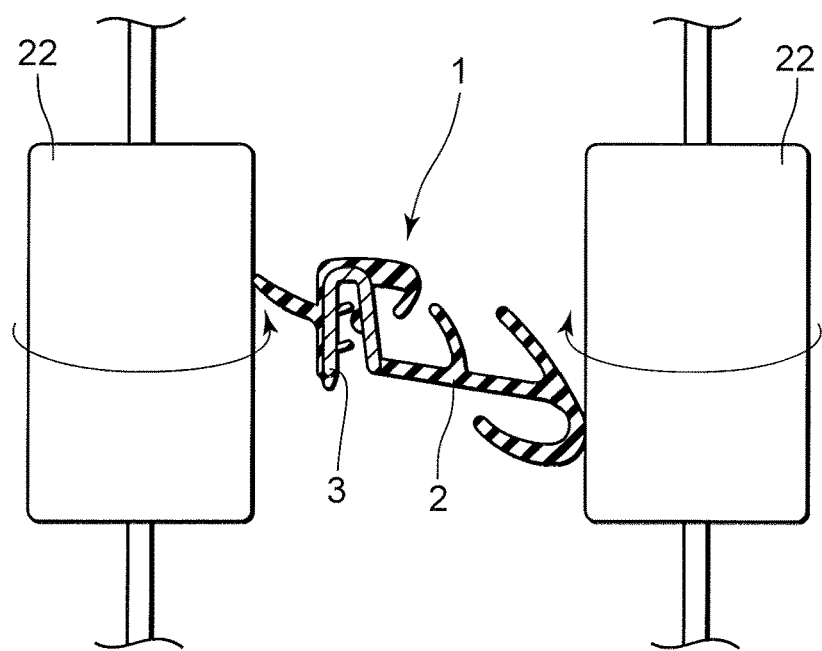
FIG. 11 is a rough sketch of an extrusion molded product integrating a core material and a seal portion according to the conventional producing method, wherein pressing forces are applied to the extrusion molded product by bending rollers.

FIG. 10 shows a still another form of extrusion molded product (1) having a core material (1), wherein an extended portion (8) is formed on the core material (3) of the extrusion molded product (1) shown in FIG. 8. Thus, the seal portion (2) seen on the right side in the Figure (i.e., on the outer side of an automobile) is formed longer by the length of the extended portion (8). Such an extended portion (8) may, of course, be provided on the core material (3) of the extrusion molded product (1) shown in FIGS. 1, 5 and 13. Also, in the extrusion molded product (1) shown in FIG. 10 or in the one shown in FIGS. 1, 5 and 13 wherein the extended portion (8) is formed on the core material (3), the aforesaid non-shrinkable element (13) may, of course, be provided inside the core material (3) of the extrusion molded product (1).

Example-2

Next, a method for producing an extrusion molded product for automobiles and an extrusion molded product itself according to Example-2 of the present invention will be hereinafter described as just one example.

Figure 12:
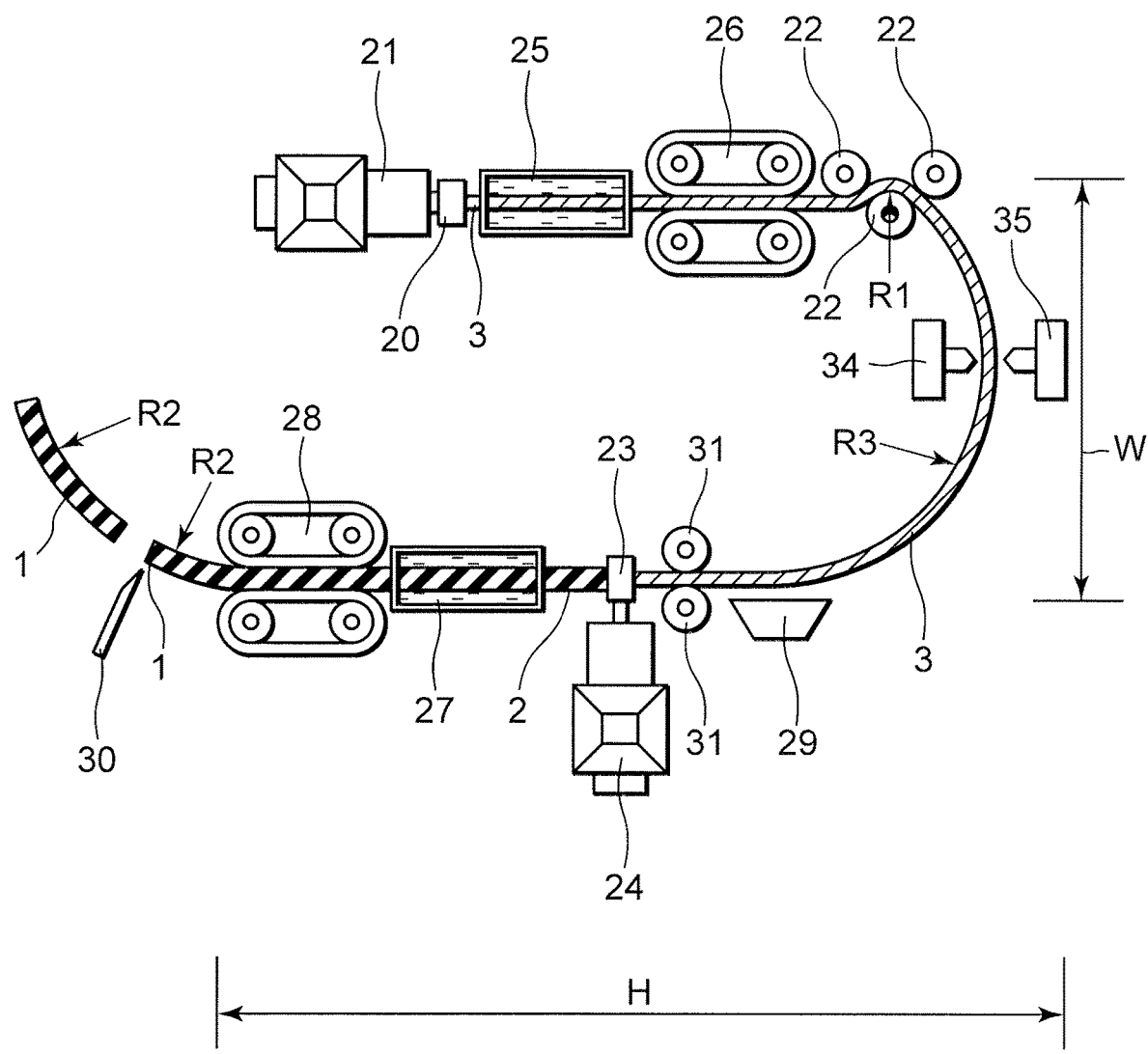
FIG. 12 is a top view of a production process of another example of a method for producing an extrusion molded product for automobiles according to the present invention, wherein a core material is bent into a curved shape by bending rollers, and goes into a second mold die in the state of being bent.

FIG. 12 is a rough sketch of a top plan view of one example of a method for producing an extrusion molded product for automobiles according to Example-2 of the present invention.

In a method for producing an extrusion molded product for automobiles according to Example-2, as shown in FIG. 12, a synthetic resin injected in a first extrusion molding machine (21) is extruded through a first mold die (20) as a core material (3). The core material (3) passes through a first cooling tank (25) and through a first take-up machine (26), and then is bent by bending rollers (22) into a desired curved shape with a radius of curvature R1, as shown in FIG. 6.

Thus far, the method for producing an extrusion molded product for automobiles according to Example-2 is the same as that of Example-1.

However, the method for producing an extrusion molded product for automobiles according to Example-2 is different from the ones according to Example-1 as shown in FIGS. 2 and 3 in that in order to shorten the full length H of a production equipment for the method for producing an extrusion molded product for automobiles, the core material (3) bent by bending rollers (22) into a curved shape with a radius of curvature R1 is fed to a second mold die (23) in the state of being bent into a curved shape with a radius of curvature R3. In this way, the full length H of the production equipment for the method for producing an extrusion molded product for automobiles according to Example-2 can be shortened, compared to the ones according to Example-1.

Here, the radius of curvature R3 of the core material (3) when the core material (3) is being fed to the second mold die (23) is not necessarily the same as the radius of curvature R1 when the core material (3) is bent by the bending rollers (22), because the radius of curvature R3 is determined based on how the production equipment is arranged in terms of the full length H and the width W of the production equipment. In many cases, the radius of curvature R3 is larger than the radius of curvature R1, that is to say, R3>R1.

In this respect, if there is a difference between the take-up speed of the first take-up machine (26) and the take-up speed of the second take-up machine (28), the radius of curvature R3 of the core material (3) between the bending rollers (22) and the second mold die (23) changes, which causes a defective molding. Thus, sensors (34,35) are provided, as necessary, to perform control so that the first and second take-up machines keep the same take-up speed.

In other words, if the take-up speed of the second take-up machine (28) is lower than the take-up speed of the first take-up machine (26), the core material (3) between the bending rollers (22) and the second mold die (23) becomes longer, and comes to contact the outer sensor (35). In that case, control is performed, for example, so that the second take-up machine (28) increases its take-up speed. If the take-up speed of the second take-up machine (28) is higher than the take-up speed of the first take-up machine (26), the core material (3) between the bending rollers (22) and the second mold die (23) becomes shorter, and comes to contact the inner sensor (34). In that case, control is performed, for example, so that the second take-up machine (28) decreases its take-up speed. In this way, control is performed so that the first and second take-up machines (26,28) keep the same take-up speed.

Then, the core material (3) bent into a curved shape with a radius of curvature R3 between the bending rollers (22) and the second mold die (23) is extended linearly just before the second mold die (23), in the same manner as the method for producing an extrusion molded product for automobiles according to the aforesaid Example-1, and travels linearly inside the second mold die (23). In this respect, guide rollers may be provided before the second mold die (23), as necessary.

After that, in the same manner as the method for producing an extrusion molded product for automobiles according to Example-1, a thermoplastic elastomer injected from the second extrusion molding machine (24) into the second mold die (23) forms seal portions (2), at least one holding lip portion (4), a coating layer (5), one or more seal lip portions (6) provided on each of the seal portions (2), and a body seal lip portion (7), on a periphery of the core material (3), thereby forming an extrusion molded product (1) as a whole.

Figure 7:
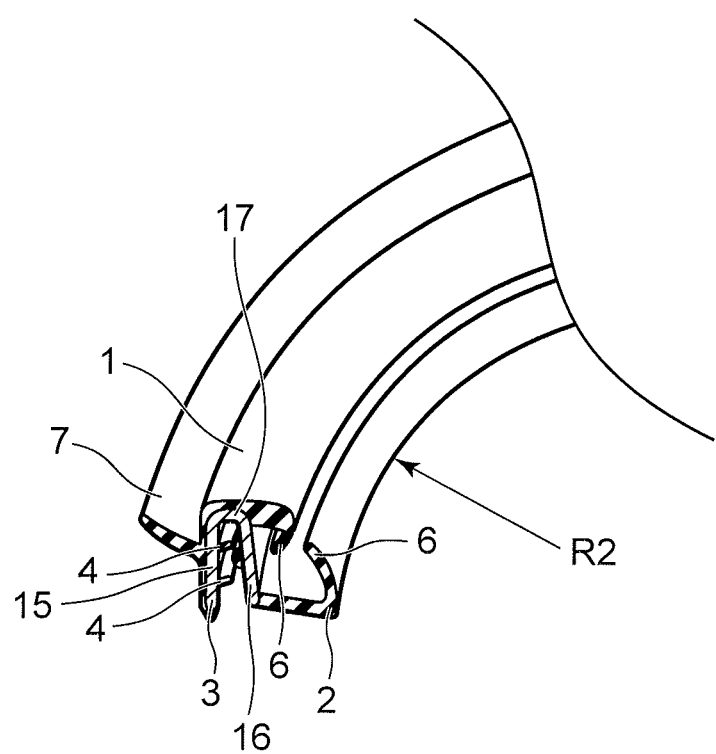
FIG. 7 is a perspective view of an extrusion molded product bent into a curved shape with a radius of curvature R2 in a method for producing an extrusion molded product for automobiles according to the present invention.

The extrusion molded product (1) thus formed passes through a second take-up machine (28), and is bent into a curved shape with a radius of curvature R2, as shown in FIG. 7, and then is cut into a desired length by a cutting machine (30).

The equipment for the production method according to Example-2 shown in FIG. 12 has a short full length H and a large width W between the first extrusion molding machine (21) and the second take-up machine (28), while the equipment for the production method according to Example-1 shown in FIGS. 2 and 3 has a long full length H and a small width W between the first extrusion molding machine (21) and the second take-up machine (28). Either of the two types of equipment according to FIG. 12 or FIGS. 2 and 3 may be chosen, as necessary.

Figure 13:
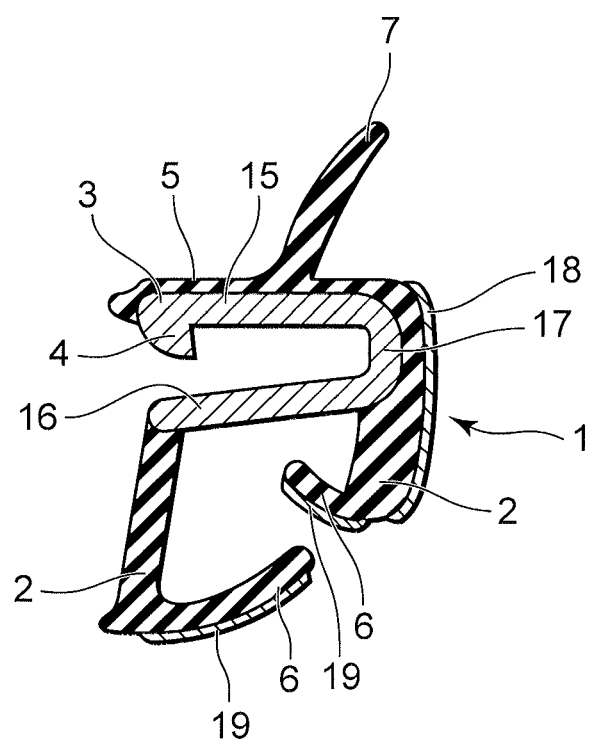
FIG. 13 is a longitudinal cross-sectional side view of an example of an extrusion molded product having a core material for automobiles, produced by a method for producing an extrusion molded product for automobiles according to the present invention, wherein a holding lip portion and the core material are formed of the same material.

In the extrusion molded product (1) shown in FIG. 13, a holding lip portion (4), which is not made of thermoplastic elastomer but of the same resin as that of the core material (3), is formed inside an outer-periphery side wall portion (15), but may be formed inside an inner-periphery side wall portion (16), as necessary. Furthermore, in FIG. 1, the holding lip portions (4) formed inside an outer-periphery side wall portion (15) and an inner-periphery side wall portion (16) may be formed of the same resin as that of the core material (3); and one or more holding lip portions (4) may be formed inside the outer-periphery side wall portion and/or the inner-periphery side wall portion.

Furthermore, as shown in FIG. 13, it is preferable that an epidermal layer (18) be formed on the extrusion molded product (1) in order to enhance scratch resistance; and sliding layers (19,19) be formed on surfaces of seal lip portions (6,6) in order to ensure that a window glass smoothly slides upwardly and downwardly. The epidermal layer (18) and the sliding layers (19,19) may also be formed on the extrusion molded product (1) shown in FIGS. 1, 8, 10 and the like.

Example-3

Next, an example of a method for producing an extrusion molded product for automobiles according to Example-3 of the present invention will be described as follows.

Figure 14:
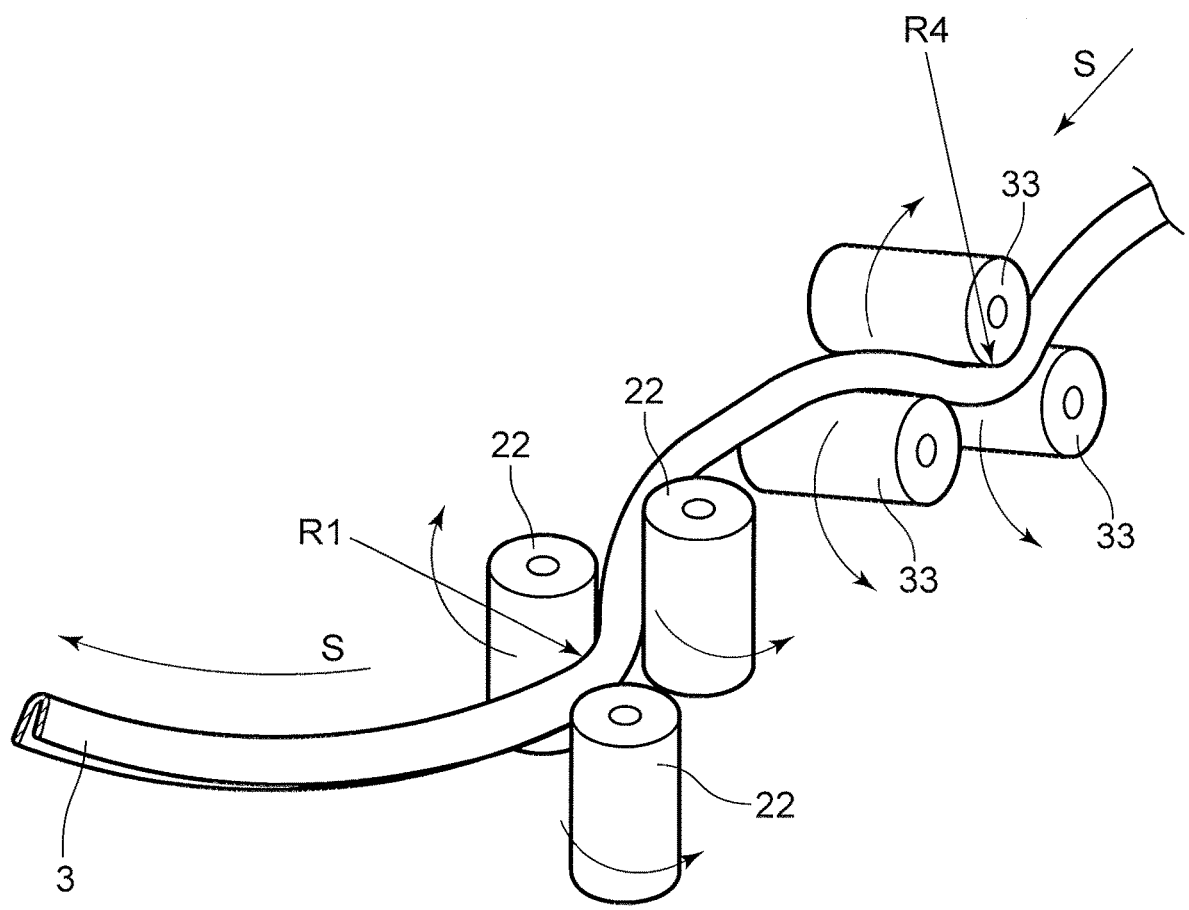
FIG. 14 is a rough sketch of a third embodiment of a method for producing an extrusion molded product according to the present invention, wherein bending rollers are arranged in vertical and horizontal directions.

FIG. 14 is a rough sketch showing only a characterizing portion of a method for producing an extrusion molded product for automobiles according to Example-3 of the present invention.

In a method for producing an extrusion molded product for automobiles according to Example-1 shown in FIGS. 2 and 3 or a method for producing an extrusion molded product for automobiles according to Example-2 shown in FIG. 12, bending rollers (22) are provided so as to bend a core material (3) in one direction. However, a method for producing an extrusion molded product for automobiles according to Example-3 shown in FIG. 14 has an additional construction, compared to those of Example-1 shown in FIGS. 2 and 3 and Example-2 shown in FIG. 12, that before the bending rollers (22), other bending rollers (33) are provided so as to bend the core material (3) in a different direction than that of the bending rollers (22). The aforesaid other bending rollers may, of course, be provided after the bending rollers (22).

In other words, in a method for producing an extrusion molded product for automobiles according to Example-3 as shown in FIG. 14, if the bending rollers (22) are for bending the core material (3) in a horizontal direction that corresponds to the direction of the radius of curvature R1 in the Figure, the other bending rollers (33) added before said bending rollers (22) are for bending the core material (3) in a vertical direction that corresponds to the direction of a radius of curvature R4 in the Figure. In this respect, the radius of curvature R4 when the bending rollers (33) for vertical-direction bending bends the core material (3) is, in many cases, 5,000 mm or more, which means that the curve of the bent portion is close to a linear line. In FIG. 14, S indicates the extruding direction.

In this way, addition of the bending rollers (33) for bending the core material (3) in a different direction than that of the bending rollers (22), allows the core material (3) to be bent not only in a horizontal direction but also in a vertical direction, thereby making it easier for the core material (3) to be fitted even on a three-dimensionally bent door frame (11). Even when using the bending rollers (22) for bending the core material (3) into a curved shape with a radius of curvature R1 in a method for producing an extrusion molded product (1) for automobiles according to Example-1 shown in FIGS. 2 and 3 or in a method for producing an extrusion molded product (1) for automobiles according to Example-2 shown in FIG. 12, the core material (3), which is made of an elastic synthetic resin, can be properly fitted on a three-dimensionally bent door frame (11).

Incidentally, FIG. 15 shows an example of a defect of an extrusion molded product (1) whose core material (3) and seal portion (2) are formed integrally and linearly according to the conventional production method, wherein when the extrusion molded product has been bent into a curved shape, a seal lip portion (6) has been transformed into a wavy shape (36).

EMBODIMENTS

Next, embodiments of a core material (3) produced according to a method for producing an extrusion molded product based on the aforesaid Examples 1 to 3 will be described, as follows.

The synthetic resin to be used for a core material (3) can be an olefin resin such as a polypropylene resin having a type A durometer hardness (Shore A) of 85 or more or a mixed synthetic resin obtained by mixing the olefin resin such as a polypropylene resin having a type A durometer hardness (Shore A) of 85 or more with 20 to 50% by weight of talc powder, wollastonite powder, or the like, which decreases the linear expansion coefficient.

As a thermoplastic elastomer to be used for the seal portions (2), holding lip portions (4), a coating layer (5), seal lip portions (6, 6) and a body seal lip portion (7), an olefin resin having a type A durometer hardness (Shore A) of 50 to 85 is adopted. In this respect, however, for the seal lip portions (6, 6), a thermoplastic elastomer of an olefin resin having a type A durometer hardness (Shore A) of 50 to 70 may be used, as necessary.

The epidermal layer (18) for enhancing scratch resistance and the sliding layers (19,19) with a small coefficient of friction provided on seal lip portions (6,6) for allowing a window glass to smoothly slide upwardly and downwardly, are preferably formed of a compound synthetic resin in which at least two types of resins selected from among high molecular weight polyethylene resin, ultra-high molecular weight polyethylene resin, olefin elastomer, stylene elastomer, silicon resin and the like are compounded, wherein the epidermal layer (18) and the sliding layers (19,19) are preferably formed of a resin having a same chemical composition.

Table 1 indicates measurement results of Embodiment 1, Embodiment 2 and Comparative example 1 concerning an extrusion molded product (1) provided with an extended portion (8) as shown in FIG. 10, and actually shows: the measurement result of the radius of curvature R1 of the curved core material in case of extruding a core material (3) of a mixed synthetic resin obtained by mixing 70% by weight of polypropylene resin with 30% by weight of wollastonite powder and allowing the core material to be bent by bending rollers (22); the measurement result of the radius of curvature R1 of the curved core material in case of extruding a core material (3) of a mixed synthetic resin obtained by mixing 70% by weight of polypropylene resin with 30% by weight of wollastonite powder and not allowing the core material to be bent by bending rollers (22); and the measurement result of the radius of curvature R2 curved portion of the extrusion molded product (1) obtained by extending the aforesaid bent core material (3) linearly and then allowing the core material (3) to go into the second mold die (23) in the state of being extended linearly, thereby forming seal portions (2), a coating layer (5) and the like of a thermoplastic elastomer having a type A durometer hardness (Shore A) of 75 on a periphery of the core material (3).

Embodiment 1 shows that a core material is bent by bending rollers (22) into a curved shape with a radius of curvature R1 of 2,800 mm, and then seal portions (2), holding lip portions (4), a coating layer (5), seal lip portions (6) and a body seal lip portion (7) that are made of thermoplastic elastomer, are formed on the core material, and in that case, there is obtained a measurement result that the radius of curvature R2 curved portion of the extrusion molded product (1) is 3,400 mm.

Embodiment 2 shows that a core material is bent by bending rollers (22) into a curved shape with a radius of curvature R1 of 1,300 mm, and then seal portions (2), holding lip portions (4), a coating layer (5), seal lip portions (6) and a body seal lip portion (7) that are made of thermoplastic elastomer, are formed on the core material, and in that case, there is obtained a measurement result that the radius of curvature R2 curved portion of the extrusion molded product (1) is 1,800 mm.

Comparative Example 1 shows that a core material (3) linearly extruded, which is not bent by bending rollers (22), has a curved portion with a radius of curvature R1 of 8, 300 mm whose curve is close to a linear line, and seal portions (2), a coating layer (5) and the like of thermoplastic elastomer are formed on the core material (3), and in that case, there is obtained a measurement result that the radius of curvature R2 of the curved shape of the extrusion molded product (1) is 8,200 mm. The extrusion molded product (1) according to Comparative Example 1, which has a curved portion with a large radius of curvature whose curve is close to a linear line, cannot be properly fitted on a door frame (11) whose radius of curvature R is mostly in the range of approximately 1,600 mm to 3,500 mm.

The aforesaid results indicate the advantage of the curved core material (3) bent by bending rollers (22) in Embodiments 1and 2 that even when seal portions (2), a coating layer (5) and the like of thermoplastic elastomer are formed by extrusion on the core material (3) later, the extrusion molded product (1) can be obtained in the state of a curved product with a radius of curvature R2, not in the state of a linear product. This ensures that an extrusion molded product is formed so as to have a curved portion with a radius of curvature that can be properly fitted even on a curved portion of a door frame (11) whose radius of curvature R is mostly in the range of approximately 1,600 mm to 3,500 mm.

As a result of the above, the curved core material (3) that has been bent according to Embodiments 1 and 2 has the advantage that even when seal portions (2), a coating layer (5) and the like of thermoplastic elastomer are formed by extrusion on the core material (3) later, the extrusion molded product (1) can be obtained in the state of a curved product with a radius of curvature R2 larger than a radius of curvature R1, not in the state of a linear product. This ensures that an extrusion molded product is produced as a curved product with a radius of curvature that can be properly fitted even on a curved portion of a door frame (11) whose radius of curvature R is mostly in the range of approximately 1,600 mm to 3,500 mm.

Furthermore, it was confirmed that the radius of curvature R2 of the curved extrusion molded product (1) is roughly proportionally larger, compared to the radius of curvature R1 of the curved core material (3). After the extrusion molded product (1) was formed, it was confirmed that there was no defect such as a crush, transformation or the like in connection with the cross section of the extrusion molded product (1).

TABLE 1

|  | Embodiment 1 | Embodiment 2 | Comparative Example 1 |
| --- | --- | --- | --- |
| Bending of the core material (3) | done | done | Not done |
| Radius of curvature R1 of the curved core material (3) (mm) | 2800 mm | 1300 mm | 8300 mm |
| Radius of curvature R2 of the curved extrusion molded product (1) (mm) | 3400 mm | 1800 mm | 8200 mm |

What is claimed is:

1. A method for producing an extrusion molded product for automobiles, wherein an extrusion molded product (1) integrating a core material (3) of synthetic resin to be fitted on a flange (12) of an automobile door frame (11) and seal portions (2) that each have one or more seal lip portions (6) to seal a door glass (10) is produced, comprising the following steps:
   injecting a synthetic resin in a first extrusion molding machine (21);
   extruding the synthetic resin through a first mold die (20) to form a core material (3);
   cooling the core material (3) by allowing it to pass through a first cooling tank (25);
   bending the core material (3) with bending rollers (22) into a desired curved shape with a radius of curvature R1;
   extending the core material (3) linearly;
   allowing the core material (3) to travel linearly inside a second mold die (23), while a thermoplastic elastomer injected in a second extrusion molding machine (24) forms seal portions (2) and seal lip portions (6) on a periphery of the core material (3); and
   allowing the core material (3) provided with the seal portions (2) and the seal lip portions (6) to pass through a take-up machine (28) to form an extrusion molded product (1), thereby forming a curved portion with a radius of curvature R2 on the extrusion molded product (1),
   wherein the radius of curvature R2 of the curved extrusion molded product (1) is larger than the radius of curvature R1 of the curved core material.

2. A method for producing an extrusion molded product for automobiles, wherein an extrusion molded product (1) integrating a core material (3) of synthetic resin to be fitted on a flange (12) of an automobile door frame (11) and seal portions (2) that each have one or more seal lip portions (6) to seal a door glass (10) is produced, comprising the following steps:
   injecting a synthetic resin in a first extrusion molding machine (21);
   extruding the synthetic resin through a first mold die (20) to form a core material (3);
   cooling the core material (3) by allowing it to pass through a first cooling tank (25);
   bending the core material (3) with bending rollers (22) into a desired curved shape with a radius of curvature R1;
   bending the core material (3) into a curved shape with a radius of curvature R3;
   feeding the core material (3) having the curved shape with a radius of curvature R3 to a position just before a second mold die (23);
   extending the core material (3) linearly;
   allowing the core material (3) to travel linearly inside the second mold die (23), while a thermoplastic elastomer injected in a second extrusion molding machine (24) forms seal portions (2) and seal lip portions (6) on a periphery of the core material (3); and
   allowing the core material (3) provided with the seal portions (2) and the seal lip portions (6) to pass through a take-up machine (28) to form an extrusion molded product (1), thereby forming a curved portion with a radius of curvature R2 on the extrusion molded product (1),
   wherein the radius of curvature R2 of the curved extrusion molded product (1) is larger than the radius of curvature R1 of the curved core material.

3. The method for producing an extrusion molded product for automobiles according to claim 1, wherein the core material (3) passes through a heating device (29) located before the second mold die (23), and then goes into the second mold die (23).

4. The method for producing an extrusion molded product for automobiles according to claim 1, wherein the synthetic resin used for forming the core material (3) is an olefin resin having a type A durometer hardness (Shore A) of 85 or more.

5. The method for producing an extrusion molded product for automobiles according claim 4, wherein the synthetic resin used for forming the core material (3) is a mixed synthetic resin obtained by mixing an olefin resin having a type A durometer hardness (Shore A) of 85 or more with 20 to 50% by weight of talc powder or wollastonite powder.

6. The method for producing an extrusion molded product for automobiles according to claim 1, wherein the thermoplastic elastomer used for forming the seal portions (2) is an olefin resin having a type A durometer hardness (Shore A) of 50 to 85.

7. The method for producing an extrusion molded product for automobiles according to claim 1, wherein at least one non-shrinkable element (13) made of metal, glass fiber or wollastonite is formed inside of the core material (3).

8. The method for producing an extrusion molded product for automobiles according to claim 1, wherein the core material (3) to be fitted on a flange (12) is provided with an outer-periphery side wall portion (15), an inner-periphery side wall portion (16) and a connecting portion (17) that connects the side wall portions, wherein at least one holding lip portion (4) is formed on at least one of the inner sides of the side wall portions (15),(16).

9. The method for producing an extrusion molded product for automobiles according to claim 2, wherein the core material (3) passes through a heating device (29) located before the second mold die (23), and then goes into the second mold die (23).

10. The method for producing an extrusion molded product for automobiles according to claim 2, wherein the synthetic resin used for forming the core material (3) is an olefin resin having a type A durometer hardness (Shore A) of 85 or more.

11. The method for producing an extrusion molded product for automobiles according claim 10, wherein the synthetic resin used for forming the core material (3) is a mixed synthetic resin obtained by mixing an olefin resin having a type A durometer hardness (Shore A) of 85 or more with 20 to 50% by weight of talc powder or wollastonite powder.

12. The method for producing an extrusion molded product for automobiles according to claim 2, wherein the thermoplastic elastomer used for forming the seal portions (2) is an olefin resin having a type A durometer hardness (Shore A) of 50 to 85.

13. The method for producing an extrusion molded product for automobiles according to claim 2, wherein at least one non-shrinkable element (13) made of metal, glass fiber or wollastonite is formed inside of the core material (3).

14. The method for producing an extrusion molded product for automobiles according to claim 2, wherein the core material (3) to be fitted on a flange (12) is provided with an outer-periphery side wall portion (15), an inner-periphery side wall portion (16) and a connecting portion (17) that connects the side wall portions, wherein at least one holding lip portion (4) is formed on at least one of the inner sides of the side wall portions (15),(16).

* * * * *